June 12, 1951     T. G. HILL ET AL     2,556,277
SELF-OPERATING VALVE FOR AIRCRAFT COOLING SYSTEMS
Filed Feb. 22, 1945     2 Sheets—Sheet 1
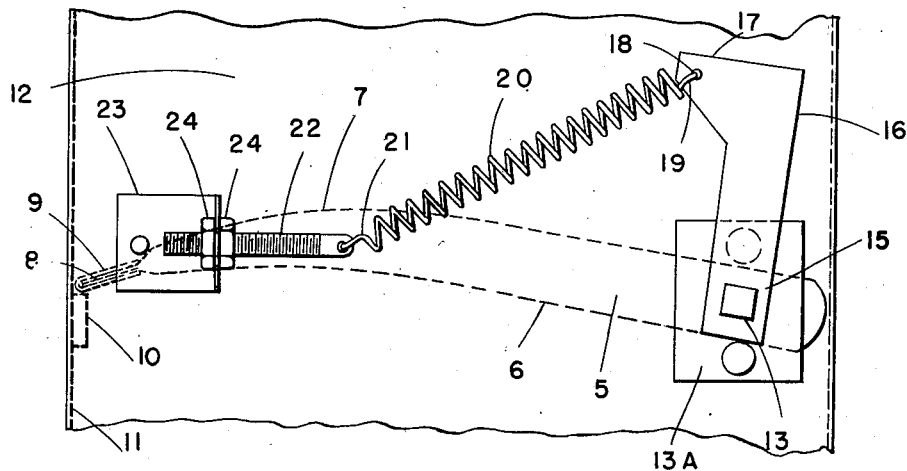
FIGURE 1.
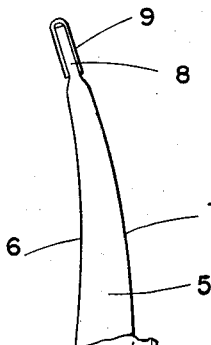
FIGURE 2.
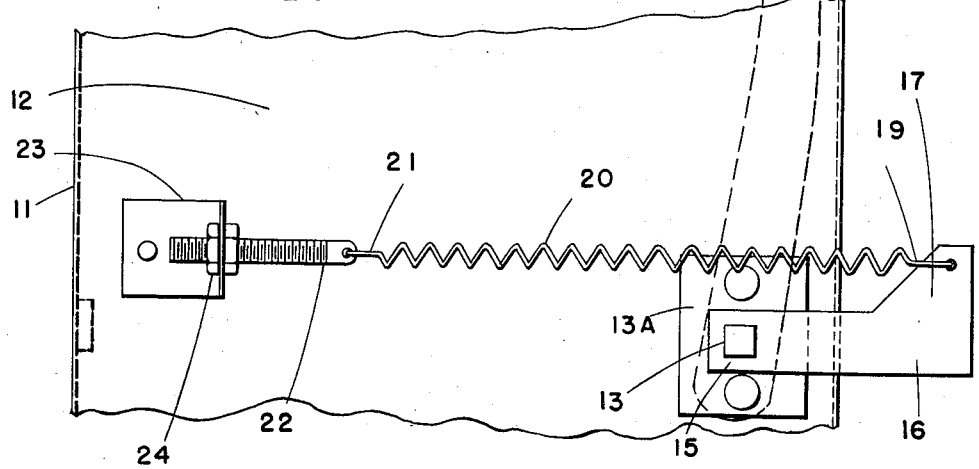
INVENTORS
THOMAS GARDNER HILL
ARTHUR N. CURL
BY
Donald W. Farrington
ATTORNEY June 12, 1951  T. G. HILL ET AL  2,556,277
SELF-OPERATING VALVE FOR AIRCRAFT COOLING SYSTEMS
Filed Feb. 22, 1945  2 Sheets-Sheet 2
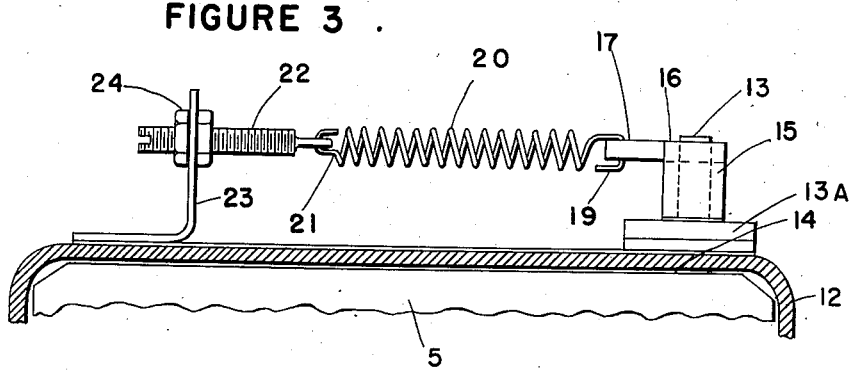
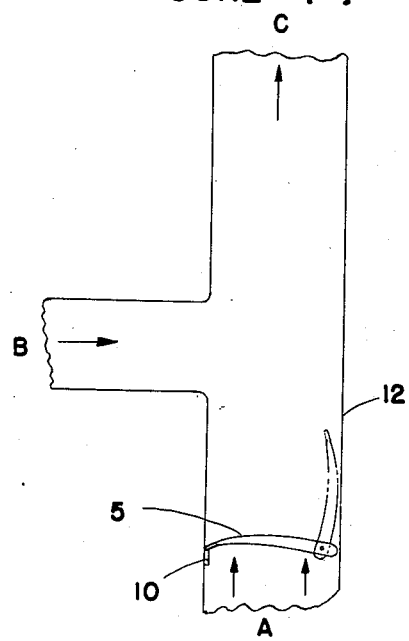
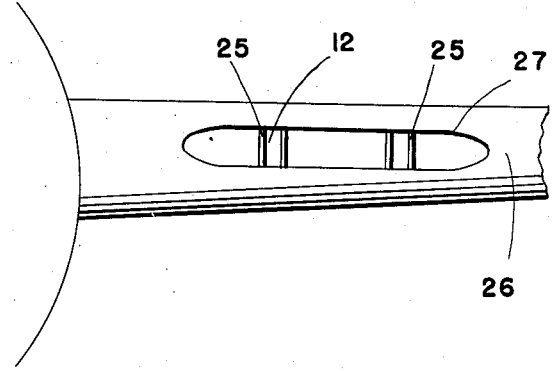
INVENTORS
THOMAS GARDNER HILL
ARTHUR N. CURL
BY
Donald W. Farrington
ATTORNEY Patented June 12, 1951

2,556,277

UNITED STATES PATENT OFFICE 2,556,277

SELF-OPERATING VALVE FOR AIRCRAFT COOLING SYSTEMS

Thomas Gardner Hill and Arthur N. Curl, Middle River, Md., assignors to The Glenn L. Martin Company, Middle River, Md., a corporation of Maryland Application February 22, 1945, Serial No. 579,272

2 Claims. (Cl. 244—57)

Our invention relates to a valve, and more particularly to a self-operating valve for use in a cooling system.

In the construction of aircraft it is essential that various media be employed for the supplying of cool air to certain accessories of the power plant to prevent the damage which would otherwise result from the excessive heating. Turbo superchargers, heat-exchange units, exhaust pipe shrouds, and the like, become subject to excessive heat with the running of the airplane motors, and one of the primary problems is the supplying of cool air to these elements. When the plane is in motion it is relatively simple to supply "ram" or forced air, occasioned by the forward movement of the plane, to the heated parts. When the plane is on the ground, ram air is not available, and where it is necessary to run the engines under such conditions the air cooling of the accessories presents a serious problem.

It will be appreciated by those skilled in the art that it is desirable to provide a source of cooling air for the power plant accessories when the plane is on the ground and that this auxiliary source of cooling air be so arranged that it will not be dissipated through the ram air inlet. Accordingly, a device to provide the auxiliary cooling on the ground should incorporate an automatic arrangement whereby the ram air inlet is automatically closed when the plane is on the ground and will be automatically opened when the plane is in flight. Furthermore, such automatic opening and closing apparatus should be constructed and arranged so that it is stable in its open position and free from destructive flutter.

It is an object of our invention to provide, for use in an automatic cooling system comprising a plurality of cool air inlets, pivoted valve means for opening and closing one of the inlets, the valve means comprising a cambered valve body and means urging said valve body to a closed position, the urging means being substantially uniform throughout the pivoting movement of the valve body so that once the urging means have been overcome by an opposing pressure the valve will be moved through its entire arc.

It is one of the objects of our invention to provide a self-operating valve which will automatically open when the ram air is available under pressure sufficient to provide cooling, and which will close when the ram air pressure falls below such predetermined pressure so as to render fan air effective for cooling.

It is a further object of our invention to provide a valve which will be stable in its open position whereby valve flutter is eliminated.

It is our further object to provide a valve having a curved profile which, when the valve is in its open position, is acted upon by the ram air stream to create a lifting, stabilizing force on the valve.

Another object of our invention is to provide a pivotally mounted valve of a curved contour, and a spring adapted to exert a force on the valve, the force of the spring remaining substantially constant throughout the pivoting of the valve, so that when the valve is open the lifting effect of the curved contour of the valve will prevent flutter.

These and other advantages of our invention will be apparent from the following description and from the accompanying drawings, wherein:

Figure 1 is a fragmentary plan view of an air duct showing our valve in its closed position;

Fig. 2 is a fragmentary plan view of an air duct showing our valve opened in response to ram air;

Fig. 3 is a view showing the spring closure adjusting means for the valve in the duct;

Fig. 4 is a diagrammatic view of a cooling system employing our valve; and

Fig. 5 is a view showing the location of the cooling system in the leading edge of an airfoil.

A valve body 5 comprises a cambered inner face 6 and a cambered outer face 7 held in spaced relation by any conventional reinforcing means and joined to form an edge 8 over which is placed a U-shaped cover 9. When the valve is in its normal closed position, the edge cover 9 rests upon a valve stop 10, secured interiorly to a wall 11 of an air duct 12 in which the valve is located.

The valve body is adapted to rotate on a valve pivot 13 journaled in a bearing 13A secured exteriorly of a wall 14 of the air duct 12. The projecting end of the pivot 13 is secured to the base 15 of a lever arm 16, at the exterior of the air duct.

The lever arm 16 comprises the base 15 and a head 17 having an eye 18 adapted to receive one end 19 of a spring 20 arranged to urge the valve to its closed position. The opposite end 21 of the spring engages a threaded rod 22 carried adjustably by a bracket 23 mounted on the wall 14 of the air duct. Two nuts 24 permit the easy adjustment of the rod 22 to increase or decrease the tension on the spring 20 whereby the valve opening in response to ram air is controlled.

The duct 12 may be conveniently formed, as shown in Fig. 5, by utilizing as outer walls the ribs 25 of the airfoil 26 in which it is located. An open slot 27 in the leading edge of the airfoil thereby provides the inlet for the ram air when the plane is in flight.

The operation of our valve is as follows:

When the airplane is on the ground (see Fig. 4) with its motors running there is no ram air entering the inlet A through the slot 27 in the airfoil, but positive pressure provided by power driven fans (not shown) is received through the inlet B.

With the forward motion of the plane the ram air builds up at A, and when the ram air pressure exceeds the combined effect of the fan air pressure and spring it moves the valve to its open position (see Fig. 2). To open the valve it is necessary to overcome the slight torque supplied by the spring 20 through the lever arm 16. This torque is kept approximately constant throughout the pivoting movement of the valve body, thereby ensuring that the valve will not remain in a partially open position, since once the ram air pressure exceeds the combined fan air pressure and the constant torque it will urge the valve to its fully opened position. This is achieved according to our invention by so positioning the spring and the lever arm with respect to the valve body that as the force of the spring increases, the perpendicular distance from the pivot to the line of the force decreases, thereby maintaining a substantially constant moment of force. This arrangement provides that the airfoil lift effect of the cambered valve body will hold the valve open in response to ram air flow.

When the valve body 5 approaches the side of the air duct 12 (Fig. 2) the cambered shape of the valve body and the interior wall of the duct create a Venturi type of air passage. Thus, as the ram air passes the valve body a negative pressure is created between the duct wall and the valve body which holds the valve body in its open position, adjacent the air duct wall. The importance of the stability of the valve will be appreciated by those skilled in the art who are aware of the destruction wrought in aircraft parts subjected to flutter and vibration.

As the forward motion of the plane decreases the ram air pressure drops, and as soon as it is balanced by the fan air pressure the spring 20 acts to close the valve body 5, thereby rendering the fan pressure effective in the cooling system.

We claim:

1. In an automatic cooling system for an aircraft having a duct so constructed and arranged as to be exposed to ram air during flight, a pivoted valve means located within said duct for opening and closing said duct to ram air, said valve means having an airfoil shaped valve body to produce a Venturi type passage with the adjacent wall of said duct in a fully opened position and means for urging said valve to a fully closed position to effect retention of air in the duct on a predetermined drop in pressure of the ram air, said urging means being so connected as to produce a substantially constant moment throughout the pivoting movement of said valve body.

2. In an automatic cooling system for aircraft or the like having a ram air intake duct, a valve located therein comprising a valve body pivoted within said duct, said pivot being spaced inwardly of one wall of said duct, whereby said valve body in open position, lies closely adjacent but spaced from said one wall for allowing air to pass on either side thereof, said valve body having an airfoil shape with a concave surface facing generally toward the intake opening of said duct when in closed position and a convex surface facing generally away from said intake opening when in closed position, said airfoil shape of said valve body producing lift tending to open said valve body throughout its movement from the fully closed to the fully open positions upon application of ram air at a predetermined pressure, said convex surface yielding a Venturi effect with the adjacent wall of said duct when said valve body is opened to the passage of air therethrough, and spring means so arranged as to produce a substantially constant moment on said valve body throughout the movement thereof, tending to close said valve upon a predetermined decrease in ram air pressure.

THOMAS GARDNER HILL.
ARTHUR N. CURL.

REFERENCES CITED

The following references are of record in the file of this patent:

UNITED STATES PATENTS

| Number | Name | Date |
|---|---|---|
| 995,057 | Cowles | June 13, 1911 |
| 1,140,871 | Brown | May 25, 1915 |
| 1,255,147 | Fletcher | Feb. 5, 1918 |
| 1,330,265 | Hinton | Feb. 10, 1920 |
| 1,471,078 | Vogt | Oct. 16, 1923 |
| 1,890,678 | Goldberg | Dec. 13, 1932 |
| 2,158,293 | Lingal | May 16, 1939 |
| 2,199,307 | Eichelberg | Apr. 30, 1940 |
| 2,380,777 | Moss | July 31, 1945 |
| 2,381,678 | Maxwell | Aug. 7, 1945 |
| 2,411,845 | Arthur et al. | Dec. 3, 1946 |

FOREIGN PATENTS

| Number | Country | Date |
|---|---|---|
| 20,241 | Great Britain | Sept. 11, 1907 |
| 394,221 | Great Britain | June 22, 1933 |